Nov. 4, 1924.  W. R. RESPESS  1,514,587
ACOUSTIC HORN AND METHOD OF MANUFACTURING THE SAME
Filed Dec. 8, 1923  3 Sheets-Sheet 1
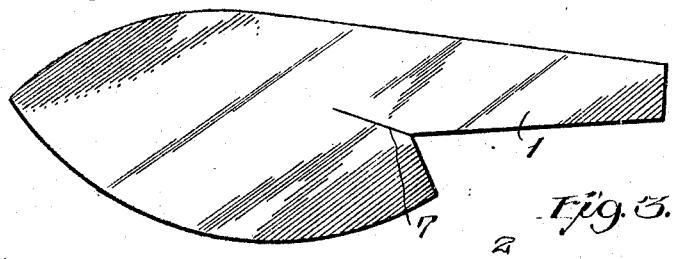
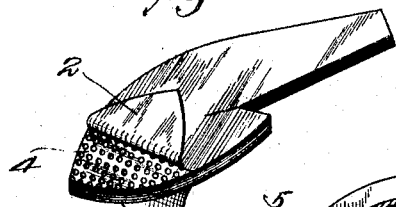
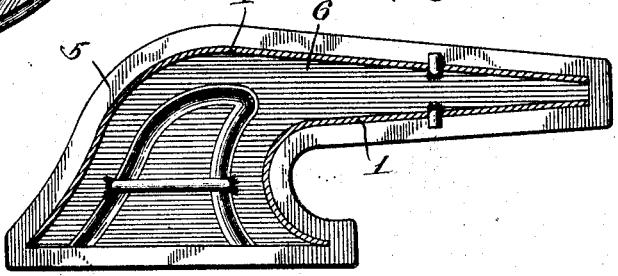
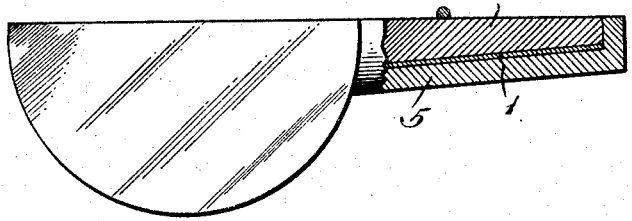
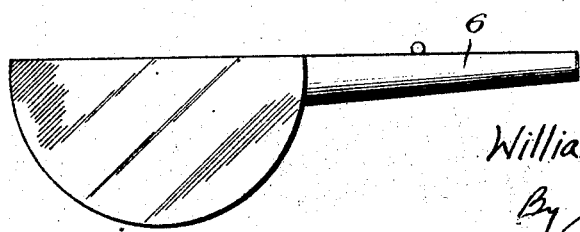
Inventor:
William R. Respess.
By John B Brady,
Attorney.

Nov. 4, 1924. 1,514,587
W. R. RESPESS
ACOUSTIC HORN AND METHOD OF MANUFACTURING THE SAME
Filed Dec. 8, 1923 3 Sheets-Sheet 2
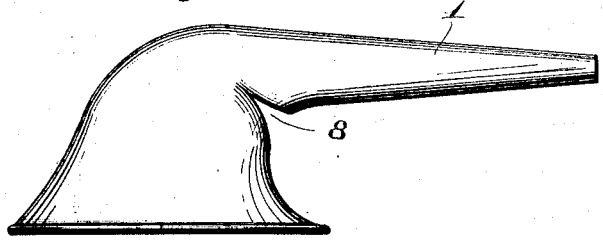
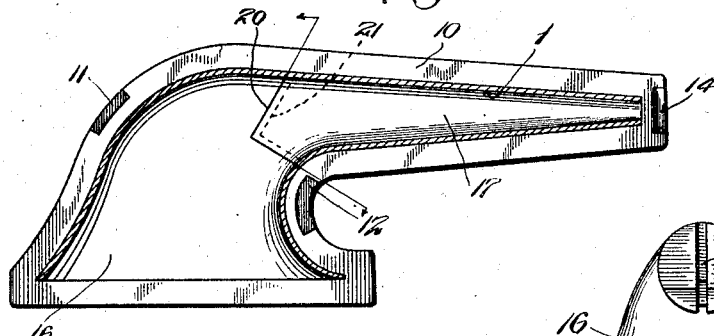
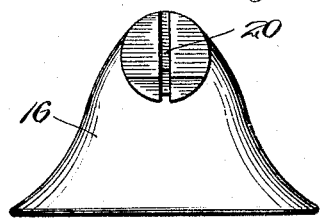
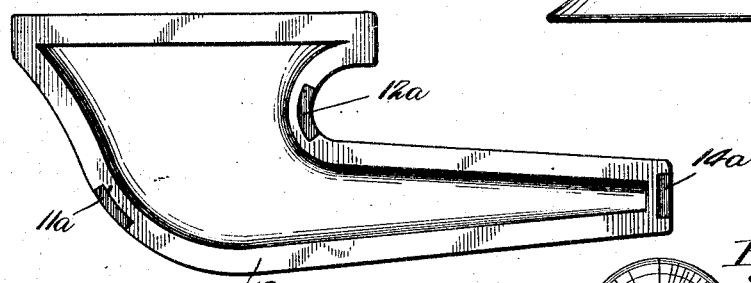
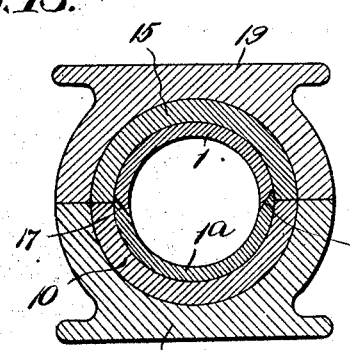
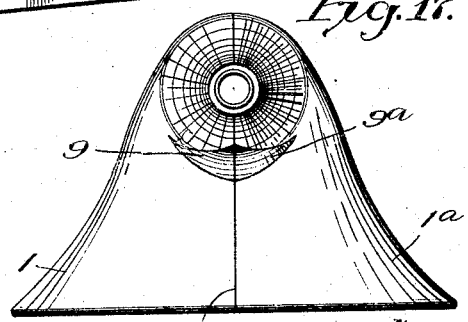
Inventor:
William R. Respess.
By John B. Brady
Attorney Nov. 4, 1924.  
W. R. RESPESS  
1,514,587  
ACOUSTIC HORN AND METHOD OF MANUFACTURING THE SAME  
Filed Dec. 8, 1923  3 Sheets-Sheet 3
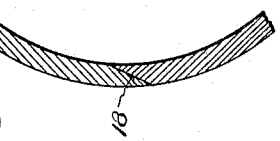
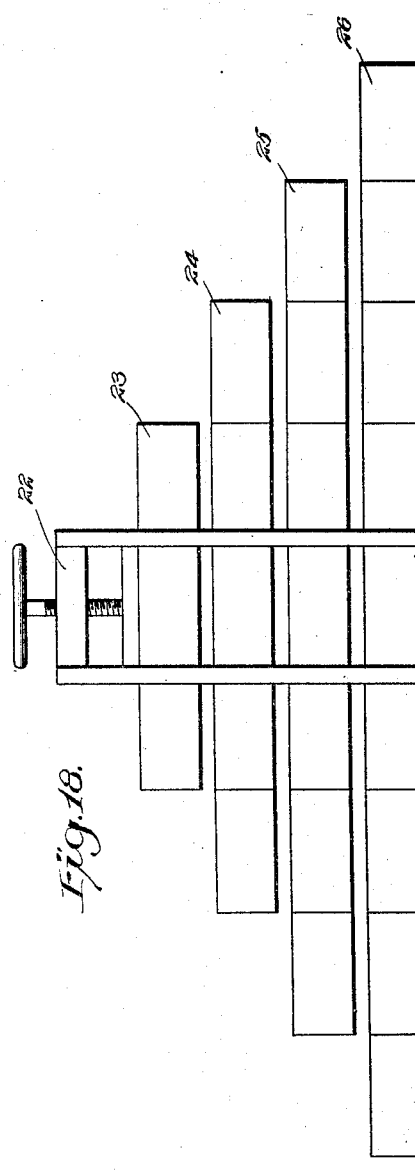
Inventor  
William R. Respess  
By John C. Brady  
Attorney Patented Nov. 4, 1924.

1,514,587

UNITED STATES PATENT OFFICE.

WILLIAM R. RESPESS, OF STATEN ISLAND, NEW YORK, ASSIGNOR TO C. BRANDES, INC., OF NEW YORK, N. Y., A CORPORATION OF NEW YORK.

ACOUSTIC HORN AND METHOD OF MANUFACTURING THE SAME.

Application filed December 8, 1923. Serial No. 679,480.

*To all whom it may concern:*

Be it known that I, WILLIAM R. RESPESS, a citizen of the United States, residing at Staten Island, in the county of Richmond and State of New York, have invented a certain new and useful Improvement in Acoustic Horns and Methods of Manufacturing the Same, of which the following is a specification.

My invention relates broadly to sound amplifying horns, and more particularly to a method of manufacturing acoustic horns for electromagnetic sound reproducers.

One of the objects of my invention is to provide a construction of sound amplifying horn which may be inexpensively manufactured on a quantity production basis.

Another object of my invention is to provide a process for the treatment of sound amplifying horns for improving their acoustic properties.

Still another object of my invention is to provide a process of manufacture for acoustic horns, in which the horn may be pressed from flat material which is securely bonded together at adjacent edges during the manufacture and finally treated to obtain a substantially invisible seam with acoustic properties of good quality.

A still further object of the invention is to establish a series of steps for the manufacture of acoustic horns which includes blanking a flat form, steam treating and hot pressing the form, beveling the edges thereof, gluing, joining, and setting the seams, and finally finishing the horn.

Other and further objects of my invention will be understood from the specification hereinafter following by reference to the accompanying drawings, in which:

Figure 1 represents one portion of material used in forming the horn, of which it will be understood there are two portions, one right and one left, blanked out in one of its possible shapes; Fig. 2 is a perspective view of one form of blank material which I may use in the construction of the horn; Fig. 3 is a cross sectional view showing the cellular wall construction of Fig. 2; Fig. 4 represents the portion of the horn illustrated in Fig. 1, being hot pressed in a die-forming mold; Fig. 5 represents a side elevation partially in cross section of the die-forming mold shown in Fig. 4 with the portion of the horn illustrated in Fig. 1 being shaped therein; Fig. 6 is a side elevation of the shaping block; Fig. 7 represents the portion of the horn shown in Fig. 1 after it has been pressed by the shaping mold; Fig. 8 is a plan view of one of the V shaped members which I may employ to fill in the gap formed during the process of pressing the portion of the horn illustrated in Fig. 1; Fig. 9 illustrates in plan view one of the gluing molds used in the process of forming the complete horn from the two portions which have been completed in the pressing mold showing the sectionalized gluing cores in position; Fig. 10 represents the other portion of the gluing mold which is used in conjunction with the portion of the gluing mold illustrated in Fig. 9; Figs. 11 and 12 are end views of the gluing cores illustrated in position in Fig. 9; Fig. 13 is a cross sectional view taken through the gluing mold showing the sections of the horn in position during the process of gluing; Figs. 14, 15 and 16 represent different methods of securing the joints of the parts of the horn in forming the seam; Fig. 17 is a plan view looking beneath the throat of the horn illustrating the position of the V shaped members which I may employ; and Fig. 18 shows one arrangement of press which may be used in the present invention in the manufacture of the horn.

Heretofore in the art it has been customary to manufacture acoustic horns from papier mâché by building up lamina of paper or fabric around a form wherein small sections of the paper or fabric are pasted together in moist condition and the product then dried. It has also been proposed to provide a pair of split dies and an inflatable core form which may be expanded to shape a plastic material in the dies which is subsequently dried forming the horn. Such horns are expensive in manufacture and it is difficult to secure uniformity of production, resulting in a quantity of rejections. Such horns require considerable polishing with inherent expense in labor.

In my invention I provide a construction of horn in which the material of the horn when completed is substantially in its original compact solid state whereby the tone quality is a function of the original material used. By reason of the pressing operations the horn may be manufactured less expensively than in the case of building up laminated papier mâché horns or molding horns from plastice material. By reason of the impregnating treatment to which I may subject my construction, I preserve the inherent tone quality of the original material. The appearance of my horn when completed is not unlike the appearance of the papier mâché horn or molded horn, although, by reason of its process of manufacture it is less expensive than any prior construction of horn.

Referring more particularly to the drawings, reference character 1 represents one form of a flat sheet of material which has been cut by means of a band saw or die pressed from a flat leather board or other suitable material. The grain of the material may run at a substantial angle with its longitudinal axis for purposes which will be later apparent. In shaping these pieces of material a number may be cut to provide lefts and others cut to provide rights, it being merely necessary to reverse the glazed surface of the material with reference to the band saw or die press.

The material may be laminated in three plies as represented in Figs. 2 and 3, the outer plies 2 and 3 being less in thickness than the inner perforated core sheet 4. The use of the perforated sheet 4 interposed between the outer walls 2 and 3 provides a cellular or hollow wall construction which modifies the acoustic properties of the horn. The material shown in Fig. 1 may be dipped in a pitch rosin compound, making it mechanically strong and preserving the inherent tone quality of the material through the reduction in the possibility of vibration. After the dipping process the horn portion may be immediately pressed, but if it becomes hard before the pressing process it may be steamed to return it to a softened condition.

When in softened condition the horn portion cut to shape as in Fig. 1 is hot-pressed in a forming mold as shown in Fig. 4. There is a right and left forming mold of the contour represented by reference character 5, the inside being machine finished to present a smooth wall to the horn material when it is pressed therein by a forming core 6. The edges of the forming die 5 are approximately one-half inch above the center line of the die and is supported in a position to permit approximately a one-fourth inch wall space between the shaping mold 6 and the inner wall of the die-forming mold 5 to allow for the material of the horn represented at 1. This operation removes a quantity of the moisture from the horn portion and rapidly dries the material. It will be understood that the shaping molds are steam packed or otherwise heated.

After the conclusion of the pressing operation the horn portion 1 will have the shape represented in Fig. 7, wherein the slotted portion 7 shown in Fig. 1 is spread to the V shape represented by reference character 8. I provide a V shaped throat portion of horn material 9 shown in Fig. 8 which is inserted in the gap and forced and locked therein with suitable cement or glue flush with the surface of the horn. Each of the horn portions at the conclusion of the hot pressing operation is dry and hard and has an excess of material along its edges. This excess material is cut off by a tool forming the edges in any one of the several manners shown in Figs. 14, 15 and 16. If I utilize a blank without the slot 7 therein and of slightly differing shape, I may form one-half of the horn completely without inclusion of a V shaped throat portion, the particles of the material at the throat being stressed and compressed.

The portions of the horn thus formed are then ready for the gluing process and are removed to the gluing molds of which there is a right and left, the left being shown in Fig. 9 by reference character 10, and the right at 15 in Fig. 10. The gluing molds each align on a center line which is not the case as in the forming molds, as previously described. Guide pins 11, 12 and 14 are formed on the face of the gluing mold in such manner that they are aligned and fitted into cooperating holes 11$^a$, 12$^a$, and 14$^a$, on the gluing mold section 15 which is the right hand section. In the gluing process one-half portion of the horn is placed in the gluing mold with glue or cement between adjacent edges and then the core members 16 and 17 placed therein. The horn may now be again pressed and the joint tightly set. It will be understood that these molds may also be steam jacketed or otherwise heated, thereby quickly drying the joint.

Fig. 13 represents the die forming molds 10 and 15 closed upon each other with the horn portions, 1 and 1$^a$ pressed therein, glue or other cementing material having been placed in the joint 17. The die-forming molds 10 and 15 may be supported in suitable cradles 19 and 19$^a$. The core sections are made in two parts as represented by reference characters 16 and 17 in Figs. 11 and 12, with joint means 20 and 21 therebetween, whereby the core members may be independently removed after the gluing process has been completed. The gluing process involves a pressing process which may be accomplished in a multiple division bailing press indicated by reference character 22 in Fig. 18. This bailing press may be provided with four or more stories with runways 23, 24, 25, and 26, and runways of different lengths to facilitate the handling of trays carrying the dies, each tray being arranged to be moved under the die press to enable pressure to be imposed upon the molds for forcing the matched sections together. Means may be provided at the side of the press for enabling the trays to be lifted and lowered for readily sliding the trays endwise. This arrangement permits me to facilitate production of horns of this manufacture. While the glued and pressed horns are being removed from one tray a horn may be in the process of pressing in the press at the same time that another tray is being loaded.

In Fig. 14 the joints of the horn section are halved together as represented by reference character 16. In Fig. 15 the joint is a beveled joint slanted in the direction represented by reference character 17 or the slant may be in the opposite direction as represented by reference character 18 in Fig. 16.

In Fig. 17 I have illustrated the appearance of the horn comprising two sections, 1 and 1ª, with the Vshaped throat members 9 and 9ª. When I press the complete halves of the horn each separately, these match together with only a longitudinal seam at the front and rear without the interposition of the throat members. Any seams which may be left after completion of the gluing and pressing process are removed by a flexible shaft sander tool which may be moved within the horn to smooth the seam or outside thereof. The periphery of the bell may be squared and leveled by placing it upon a sander belt. The edge may then be rounded with an edging tool. The end of the horn may be squared upon a sander wheel or belt and a ferrule secured thereon. The horn may then be again dipped to render it moisture proof and then a suitable filler applied to the seam or upon any imperfections in the surface. A final coating of crystalline varnish may be applied to the horn to add to its appearance.

By my improved process in the manufacture of acoustic horns, I provide a method by which the horn material may be blanked out simultaneously in numbers of fifty or more. The material may be softened either by impregnating in the pitch rosin compound or in hot or cold water, or by steaming. The shaping process for both left and right portions of the horn is quickly performed while the flat material is in softened condition. The parts are hot pressed, the edges beveled, and the two portions placed in the gluing molds where they are locked together under contact pressure, the pressure existing for a period of several minutes. A buffer is then employed to smooth the joints both inside and outside and the edges of the bell beveled and rounded. The horn may be dipped to secure a pleasing appearance and a suitable surface appearance imparted thereto. By reason of the impregnation previously referred to and the cellular construction of the wall of the horn, pleasing acoustic properties are secured. It will be appreciated that my process greatly increases the possibilities of horn production over construction of horns as heretofore known. The locked joint formed by either the halved together edges or overlapping beveled edges insures the formation of a shell substantially opaque to sound.

While I have described my invention in certain particular embodiments, it is to be understood that various modifications may be made, and that I intend no limitations upon the invention other than are imposed by the scope of the appended claims.

Having thus described my invention what I claim and desire to secure by Letters Patent of the United States is as follows:

1. The method of manufacturing an acoustic horn which consists in cutting a fibrous board substantially in the shape of a horn with the grain of said board running in a direction at an angle with longitudinal axis of the horn, slotting a portion of the board, softening the board, pressing the board substantially the shape of one half of the completed horn, beveling the edges of the product thereby formed, positioning said product adjacent an oppositely shaped product, gluing, pressing and finishing said product whereby a completed horn is formed.

2. The method of manufacturing an acoustic horn which consists in cutting a flat fiber board substantially in the shape of a horn with the grain of said board running substantially at an angle with the longitudinal axis of the horn, impregnating the board with a material operating to improve the acoustic properties thereof, rolling the board while in softened condition around a forming mold for forming substantially one half of the completed horn, cutting the edges of said horn for forming a joint substantially opaque to sound with an oppositely formed board comprising the other part of said horn, gluing the parts and subjecting same to pressure whereby said parts are firmly secured together in a manner substantially opaque to sound.

3. The process of forming an acoustic horn from flat fibrous board material which consists of cutting a pair of boards in opposite shapes, softening each of the boards, rolling the boards opposite to each other, cutting the edges of the boards for joining the seam in locked relationship and gluing and pressing the horn to a completed shape forming a shell substantially opaque to sound.

WILLIAM R. RESPESS.